United States Patent
Kalbacher (10) Patent No.: US 10,113,807 B2
(45) Date of Patent: Oct. 30, 2018

(54) INDIRECT-TYPE AIR COOLER

(71) Applicant: Modine Manufacturing Company, Racine, WI (US)

(72) Inventor: Klaus Kalbacher, Rangendingen (DE)

(73) Assignee: Modine Manufacturing Company, Racine, WI (US)

(*) Notice: Subject to any disclaimer, the term of this patent is extended or adjusted under 35 U.S.C. 154(b) by 0 days.

(21) Appl. No.: 15/504,036

(22) PCT Filed: Aug. 13, 2015

(86) PCT No.: PCT/US2015/045095
§ 371 (c)(1),
(2) Date: Feb. 15, 2017

(87) PCT Pub. No.: WO2016/028604
PCT Pub. Date: Feb. 25, 2016

(65) Prior Publication Data
US 2017/0227295 A1     Aug. 10, 2017

(30) Foreign Application Priority Data
Aug. 16, 2014   (DE) .................. 10 2014 012 179

(51) Int. Cl.
*F28F 27/02*     (2006.01)
*F28D 9/00*      (2006.01)
(Continued)

(52) U.S. Cl.
CPC .......... *F28D 9/0056* (2013.01); *F28F 9/0256* (2013.01); *F28F 21/065* (2013.01);
(Continued)

(58) Field of Classification Search
CPC .......... F28D 9/0056; F28D 2021/0082; F28D 23/12; F28D 5/00; F28F 9/0256;
(Continued)

(56) References Cited

U.S. PATENT DOCUMENTS

| 4,011,905 A | 3/1977 | Millard |
| 4,061,187 A | 12/1977 | Rajasekaran et al. |

(Continued)

FOREIGN PATENT DOCUMENTS

| DE | 3330710 A1 | 9/1982 |
| DE | 4328448 C2 | 8/1995 |

(Continued)

OTHER PUBLICATIONS

International Search Report and Written Opinion for Application No. PCT/US2015/045095 dated Nov. 24, 2015 (15 pages).

*Primary Examiner* — Davis Hwu
(74) *Attorney, Agent, or Firm* — Michael Best & Friedrich LLP; Jeroen Valensa; Michael Bergnach (57) ABSTRACT

The invention relates to an indirect-type air cooler by way of which compressed charge air for an internal-combustion engine is cooled by means of a liquid, wherein the air cooler is constructed from stacked pairs of plates having fins which are disposed therebetween, and the brazed stack is disposed in a housing into which the charge air flows, flows through the fins and exits the housing again. The charge air exchanges heat with the liquid which flows in the plate pairs and which is introducible into the plate pairs via at least one inlet and via inlet-side plate openings which are flush in the stack and is dischargeable via at least one outlet by means of flush outlet-side plate openings. In order to further improve the performance potential of the air cooler, at least one venting element which extends to the exterior through an opening of the housing is connected to a liquid space within the stack.

22 Claims, 7 Drawing Sheets

(51) Int. Cl.
*F28F 9/02* (2006.01)
*F28F 21/06* (2006.01)
F02B 29/04 (2006.01)
F28D 21/00 (2006.01)

(52) U.S. Cl.
CPC ........ *F28F 21/067* (2013.01); *F02B 29/0462* (2013.01); *F28D 2021/0082* (2013.01); *F28F 2265/06* (2013.01); *F28F 2265/18* (2013.01); *F28F 2275/04* (2013.01)

(58) Field of Classification Search
CPC .... F28F 21/065; F28F 21/067; F28F 2265/06; F02B 29/0462
USPC ........................................................ 165/100
See application file for complete search history.

(56) References Cited

U.S. PATENT DOCUMENTS

| | | | |
|---|---|---|---|
| 6,102,103 A | | 8/2000 | Zobel et al. |
| 2003/0205054 A1* | | 11/2003 | Nori ............... H01L 23/427 62/259.4 |
| 2004/0177950 A1 | | 9/2004 | Gluck |
| 2013/0149087 A1 | | 6/2013 | Jones |

FOREIGN PATENT DOCUMENTS

| | | |
|---|---|---|
| DE | 102005005043 A1 | 8/2006 |
| EP | 0075750 B1 | 12/1985 |
| EP | 1452816 A2 | 9/2004 |
| WO | 2013149087 A1 | 10/2013 |

\* cited by examiner

INDIRECT-TYPE AIR COOLER

CROSS REFERENCE TO RELATED APPLICATIONS

This application claims priority to German Patent Application No. 10 2014 012 179 filed Aug. 16, 2014, the entire contents of which are hereby incorporated by reference herein.

BACKGROUND

The invention relates to an indirect-type air cooler, in which air, for example compressed charge air for an internal-combustion engine, is cooled by means of a liquid, wherein the air cooler is constructed from stacked pairs of plates having fins which are disposed therebetween, and the brazed stack is disposed in a housing into which the charge air flows, flows through the fins and exits the housing again, wherein said charge air exchanges heat with the liquid which flows in the plate pairs and which is introducible into the plate pairs via at least one inlet and via plate openings which are flush in the stack and is dischargeable via at least one outlet by means of other flush plate openings.

An indirect-type charge-air cooler having the features mentioned at the outset is disclosed in DE 10 2012 006 346 A1. While this document proposes a throughflow based on counterflow, on account of which remarkable heat-exchange efficiency may be achieved, there is need for further improvement in this respect.

Occasionally, gas bubbles, which have a negative effect on efficiency and often cause other disadvantages, are located in the coolant. This, of course, is not a novel type of problem. In general, this is addressed by employing venting pipes or by taking similar measures, for example disposing a separation wall having openings disposed at the top thereof, so that the gas bubbles can escape.

Gas bubbles or air bubbles have a particularly negative effect when, on account of a predefined installation position of a heat exchanger or on account of other reasons, the bubbles accumulate in a space which is flowed through by the liquid and can only be dissipated with difficulty or not at all.

The prior art which has been identified with reference to venting in the context of heat exchangers is disclosed in DE 28 40 813 C2, in DE 43 28 448 C2, in EP 257 111 A1, in DE 10 2005 005 043 A1, or in EP 075 750 B1, to name but a few such published documents.

In these published documents, heat exchangers which are typically employed as coolant coolers or else as heating heat exchangers are described. Said heat exchangers have a pipe-and-fin block, that is to say they do not have pairs of plates or a housing, and also accumulator boxes which are often rather voluminous which are disposed at opposite ends of the pipes. The mentioned venting pipes are typically disposed in one of the accumulator boxes and from there enable gas bubbles to escape from the coolant, or to be directed to an expansion tank where degassing is possible, respectively. A free cooling-air stream which is conveyed by a fan flows through the fins of such heat exchangers which, in contrast to indirect-type air coolers, are often disposed in the forward region of motor vehicles. In the case of EP 075 750 B1, the heat exchanger is a heater which is part of an air-conditioning system and which makes available a heating-air stream.

SUMMARY

An object of the invention is to propose a way of venting the coolant for the air cooler, which is effective and which does not substantially increase the cost of this air cooler in terms of its manufacture.

This object is achieved in some embodiments of the invention by an indirect-type air cooler which has the features according to the following description of exemplary embodiments.

An alternative according to some embodiments of the invention, which in terms of venting is less effective, can offer advantages in that it is less complex to manufacture.

One particular feature of some embodiments of the invention is that at least one elongate venting element, such as a venting pipe, for example, is connected to a liquid space of the stack, which venting element from there extends through a plate opening 1c and through an opening 30 in a wall of the housing 3 to the exterior of the latter. This effective venting contributes toward improving the efficiency of the heat exchange.

A liquid space of the stack is that liquid space which is configured so as to be substantially within the plate pairs of the stack. Said liquid space comprises all spaces in which liquid is present or in which the liquid and/or gas bubbles contained therein may be located in the normal operating mode of the air cooler.

In one particularly preferred exemplary embodiment, the plate opening 1c corresponds with the opening 30 in the wall of the housing. The openings 1c, 30 also bear on one another. On account of this measure, the compact configuration of the air cooler is maintained.

Furthermore, the plate opening 1c mostly also comprises a breakthrough which is located in a cover plate or base plate of the stack. The cover plate or base plate is located between that plate that has the opening 1c and the housing wall.

The disposal of a venting element so as to be connected to the mentioned liquid space is to be understood according to a first alternative such that the one end of the element should be connected to the mentioned plate opening 1c. Therefore, the element per se does not necessarily have to be located within the liquid space. Guide elements or similar, which support directing of gas bubbles to the opening and thus promote degassing, may additionally be located in the plate opening.

According to a second alternative, the pipe could in fact significantly extend into the mentioned liquid space, for example up to a specific point of the liquid space which is particularly exposed as an accumulation point for gas bubbles. The pipe here may also be correspondingly shaped, for example be configured so as to have coils or similar formations.

Part of the mentioned entire space which is enclosed by the plates, namely that part-space which is formed by the plate openings which are flush in the stack, is a preferred liquid space. As is well known, such a part-space is an inlet space. Another part-space is an outlet space.

Providing venting in even other part-spaces of the entire space, for example in those part-spaces in which heat is exchanged with air, appears to be less effective and more complex in its technical implementation.

It should be particularly favorable for a venting pipe to be disposed having its one end in the inlet space, opposite the inlet, for example, so that gas bubbles which are contained in the coolant can be extracted even prior to the plate pairs or the part-spaces mentioned being flowed through, respectively.

One preferred embodiment provides a metallic venting pipe which is brazed to the stack. The connection of the pipe in the abovementioned plate opening in this case is also a brazed connection.

Furthermore, the housing of the air cooler can include the mentioned opening through which the pipe can extend to the exterior, for example. This opening should be sealed in relation to the pipe, so as to prevent the air to be cooled or the already cooled air from being able to escape from the housing. In the case of a housing of plastics which, on account of the pressure of the charge air, possibly performs pulsating movements, sealing should be carried out in a sufficiently careful manner.

For constructive reasons—that is to say, in order to be able to readily carry out the assembly of the stack in the housing—a connector piece or a similar connector element may be located on the housing opening. A first pipe, which is connected to the mentioned part-space and which thus is preferably brazed to the stack, opens into the connector piece. Another further pipe, which is operatively connected to the first pipe, may then extend out of the connector piece to the exterior of the housing.

As is known per se, the other pipe can be connected to an expansion tank which is often located in a coolant circuit, for example of a motor vehicle. The other pipe does not have to be routed to the expansion tank as an individual line. It is often sufficient for the other pipe to directly open into a return line for the coolant. The venting pipe may directly open into the return line of the coolant of the air cooler. On account of the already mentioned compact disposal, the port will preferably be disposed outside the housing.

In one embodiment of the invention, the inlet and the outlet are disposed on a lower side of the stack and of the housing, since this is demanded by a prescribed installation situation. In such cases it is meaningful for the venting pipe to extend along approximately an entire height of the stack and for the plate opening as well as the opening of the housing to be likewise located in/on the mentioned lower side.

With regard to routing the pipe along the entire stack height, two alternatives have been considered by the inventor. In a first and possibly preferred alternative, the pipe extends within the stack of plate pairs and fins and therethrough, namely through the inlet-stream openings of the plates, for example, which to this end have a suitable size.

However, in other cases the pipe extends outside the stack but still within the housing and also along the entire stack height. This variant offers itself in particular when the inlet openings and the outlet openings are located within plate protrusions, and the plate protrusions are collectively disposed on a longitudinal side or transverse side of the plates. A free space is present between the protrusions. The free space offers itself for routing the pipe therethrough, so as to thereafter pass through the mentioned opening on the mentioned lower side.

In the case of comparatively small air coolers having comparatively low flow rates on the coolant side, it may already be sufficient for the pipe to have an internal diameter of about 1 to 4 mm.

The invention is described in exemplary embodiments by means of the appended drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
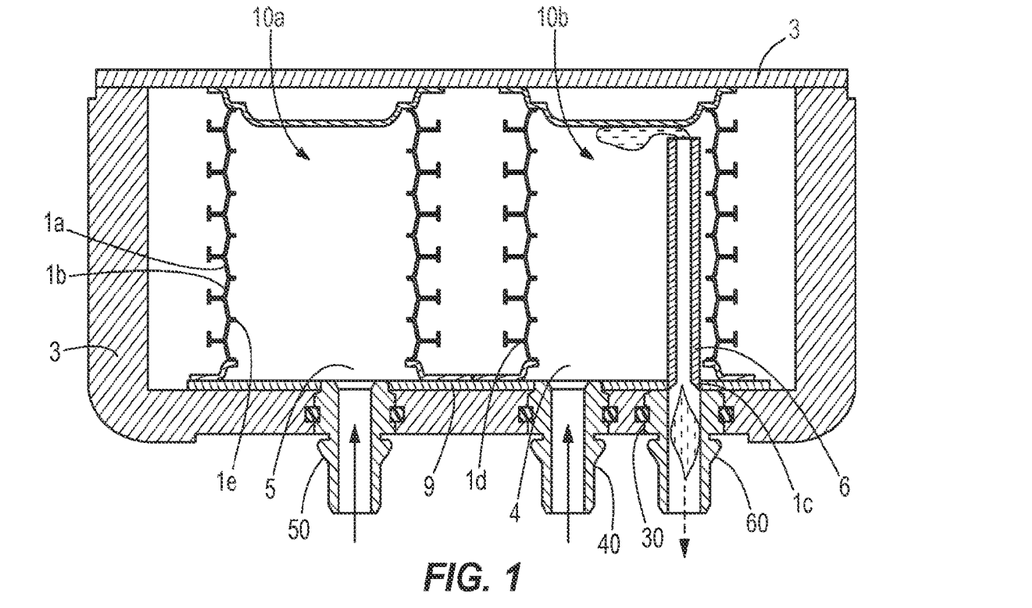
FIG. 1 is a sectional elevation view of a first embodiment of an indirect-type air cooler according to the present invention.
Figure 2:
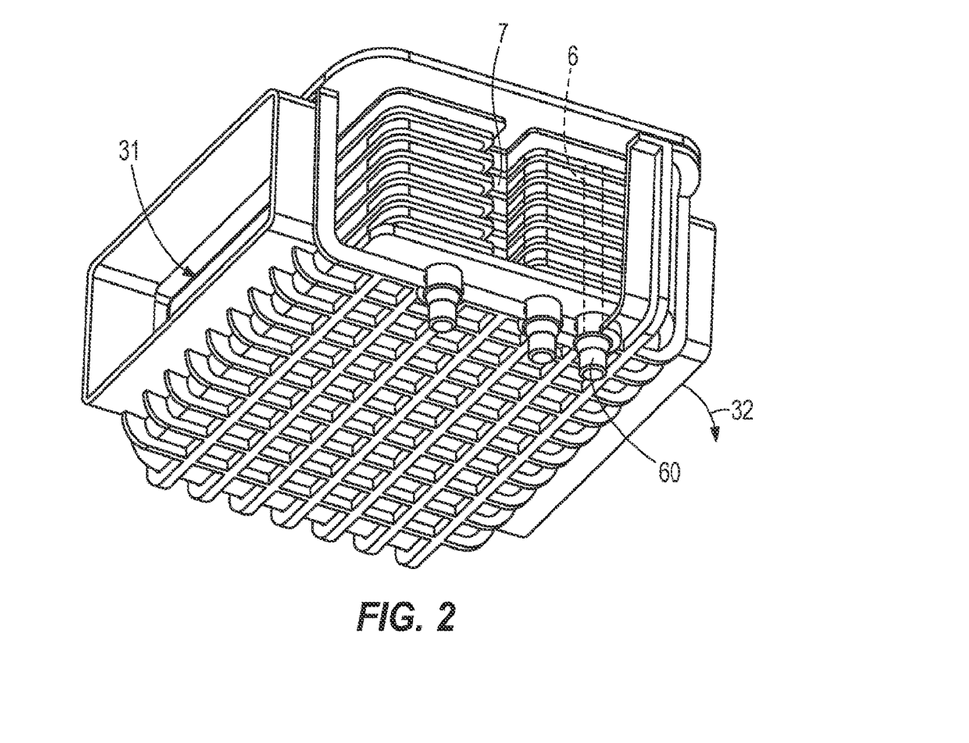
FIG. 2 is a perspective view of the air cooler of FIG. 1.
Figure 3:
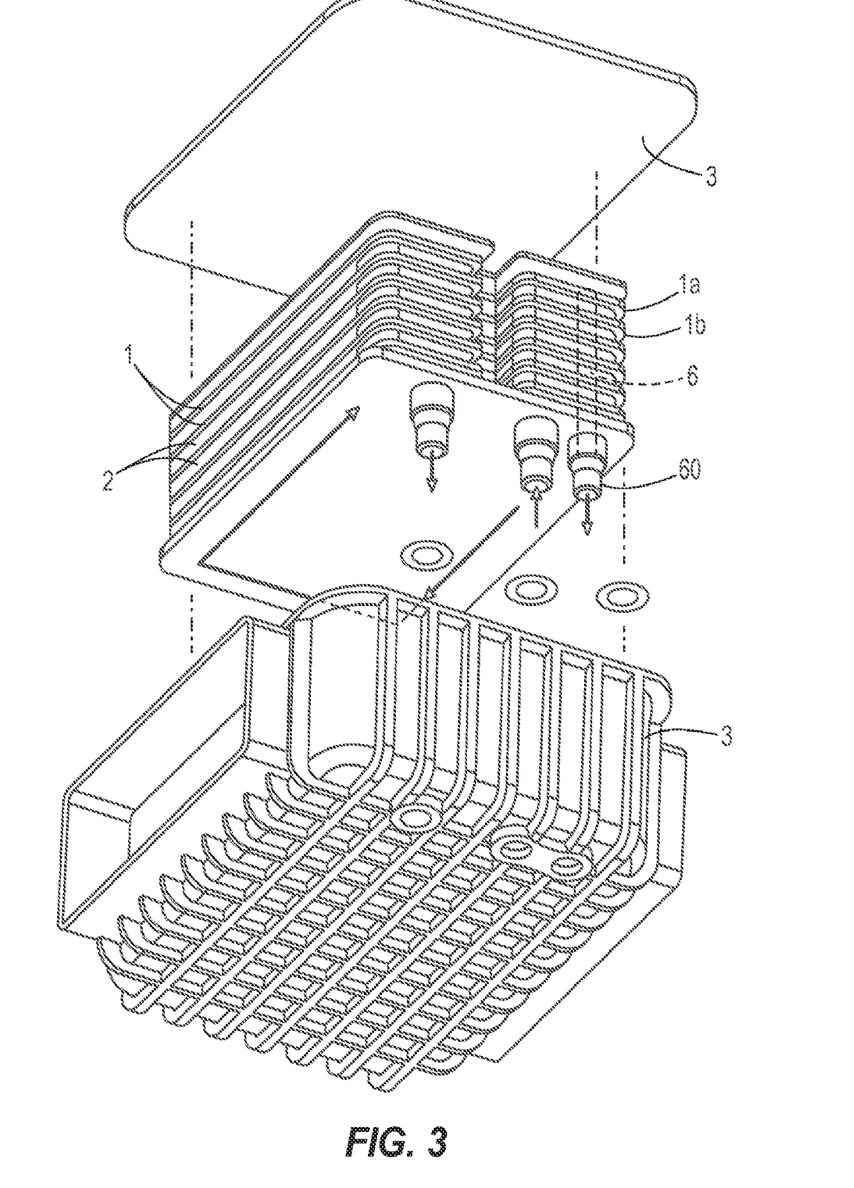
FIG. 3 is an exploded perspective view of the air cooler of FIG. 1.

FIGS. 1 to 3 illustrate a first and possibly preferred exemplary embodiment in which venting is carried out within the liquid space 10 which is enclosed by the plate pairs 1*a*, 1*b* of the stack.

FIGS. 4 to 7 show another exemplary embodiment in which a venting element 6 is likewise connected to the mentioned liquid space 10, wherein the element 6 per se, however, is mainly disposed outside the stack. As compared with the first exemplary embodiment, this exemplary embodiment has the disadvantage that the venting element 6 has to extend through two plate openings 1*c*. In the first exemplary embodiment, only a single plate opening 1*c* is necessary.

Figure 9:
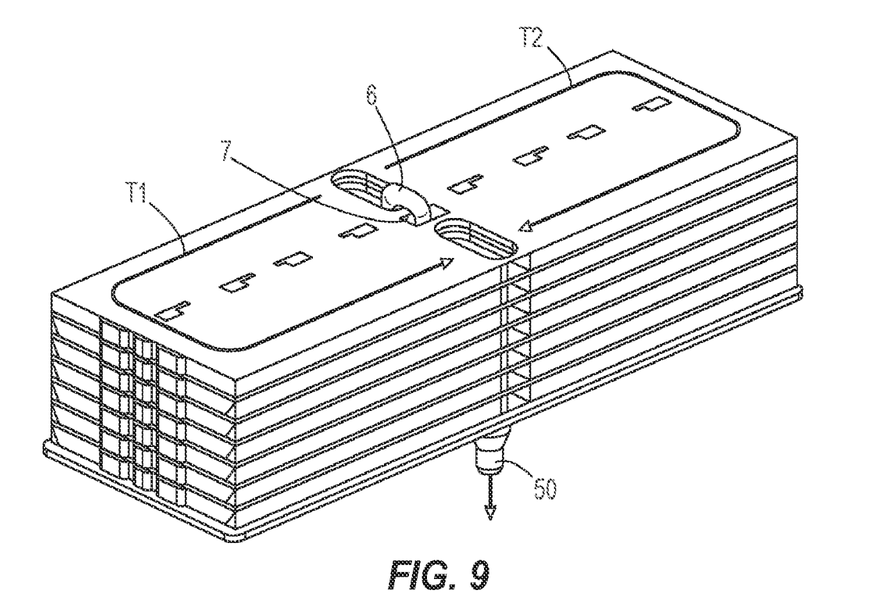
FIG. 9 is a perspective view of a third embodiment of an indirect-type air cooler according to the present invention.
Figure 10:
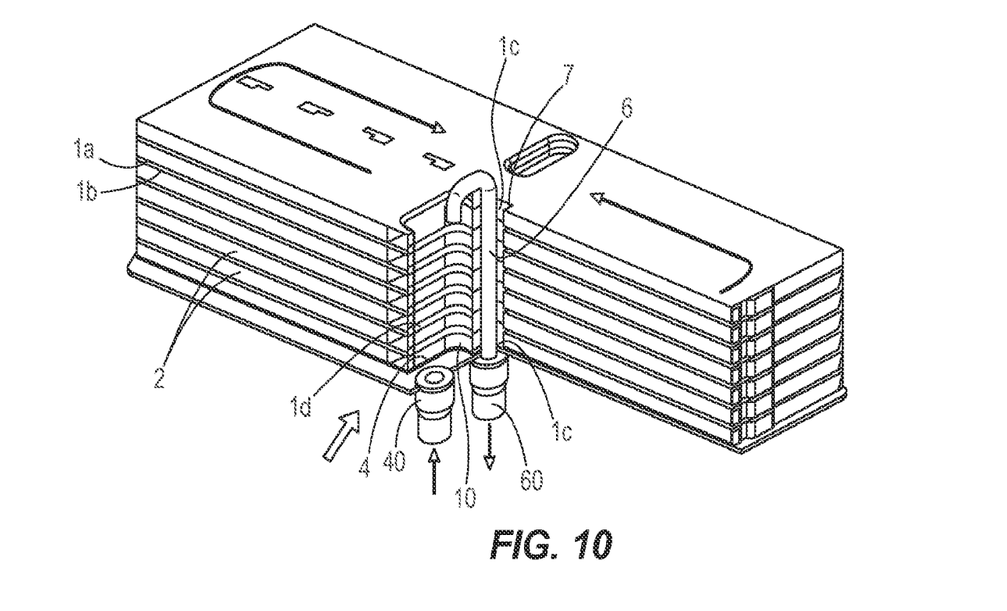
FIG. 10 is a partially sectioned perspective view of the air cooler of FIG. 9.

FIGS. 9 and 10 show a further exemplary embodiment which, borrowing from that of FIGS. 4 to 7, has been refined in terms of the design of the stack. In contrast to the preceding embodiments, the inlet 4 and the outlet 5 are located so as to be approximately in the center of the stack. However, the venting element 6 is between the inlet 4 and the outlet 5 also here.

FIGS. 1 to 7 and 9 and 10 show indirect-type air coolers by way of which compressed charge air for an internal-combustion engine is cooled by means of a liquid, wherein the air cooler is constructed from stacked pairs 1*a*, 1*b* of plates 1 having fins 2 which are disposed therebetween, and the brazed stack is disposed in a housing 3 into which the charge air flows, flows through the fins 2 and exits the housing 3 again. A corresponding inlet and an outlet for the charge air have the reference signs 31 and 32 in FIG. 2. The charge air exchanges heat with the liquid which flows in the plate pairs 1*a*, 1*b*. Via an inlet 4 and via inlet-side plate openings 1*d* which are flush in the stack, the liquid flows into the plate pairs 1*a*, 1*b*, and flows out again via an outlet 5 by means of flush outlet-side plate openings 1*e*.

A venting element 6 is connected to a liquid space 10 which is embedded in the plate pairs 1*a*, 1*b* of the stack. The venting element 6 further extends to the exterior through an opening 30 of the housing 3.

Figure 8:
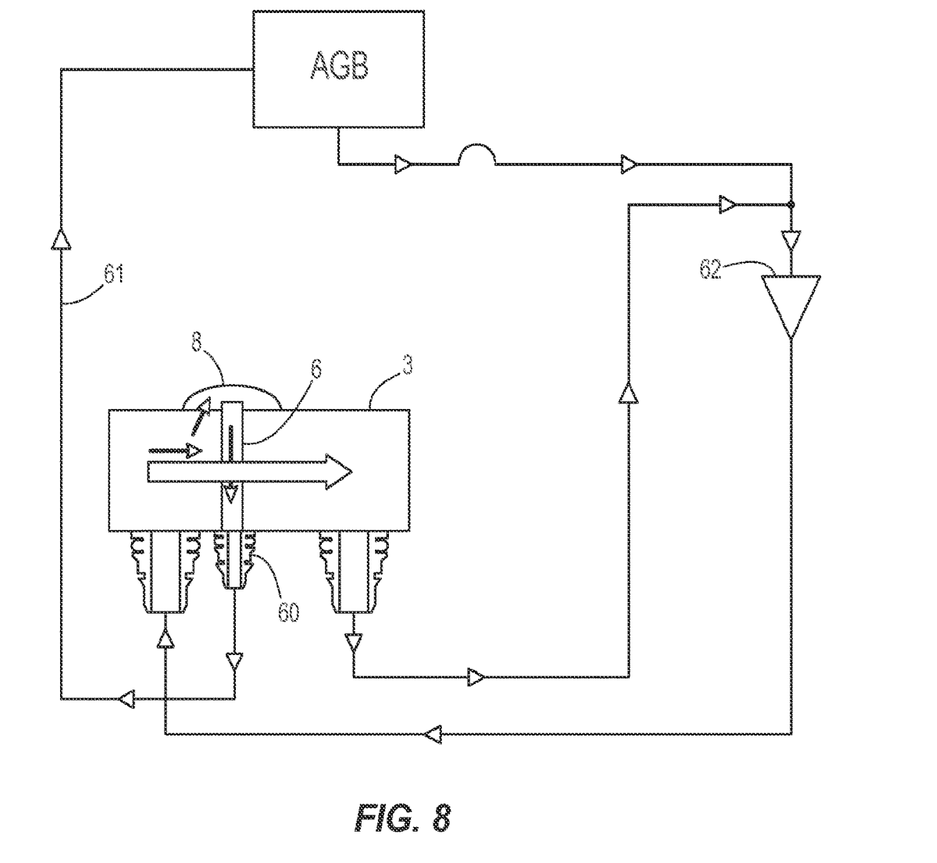
FIG. 8 is a schematic view illustrating a coolant circuit in which an air cooler according to the present invention is located.

Depending on the design of the coolant circuit, the venting element 6 may be routed further by means of a line 61 to an expansion tank AGB, as is shown in FIG. 8.

With regard to the opening 30, it should also be stressed that this does not necessarily have to be a separate opening 30 for the venting element 6. In some embodiments, the opening 30 may also be unified with an inlet opening 4 or an outlet opening 5, which is present in the housing 3 in any case. It is to be essential only that the venting element 6 extends to the exterior of the housing 3.

In other cases it may already be sufficient for the venting element 6 to be incorporated in a return line for the liquid. However, it is unfavorable for the liquid which is enriched with gas bubbles to be fed to a pump 62 (FIG. 8). If incorporation in the return line is nevertheless planned, this should take place outside the housing 3, that is to say after the venting element 6 has traversed the housing opening 30, since such a design has advantages in terms of compactness and assembly.

Figure 12:
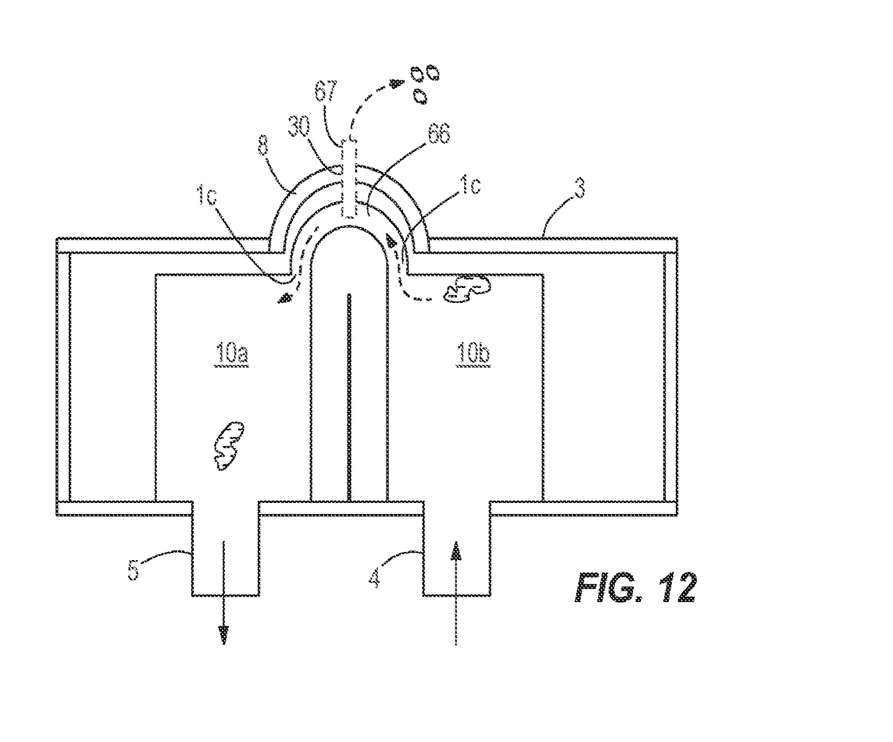

A simple bypass 66 between an inlet space 10*b* which is described in more detail below and an outlet space 10*a*, disposed so as to be opposite the inlet 4 and the outlet 5, has a certain venting effect. This alternative, which could offer adequate results for many applications, is shown in FIG. 12 and described in more detail further below.

The venting element 6 comprises at least one venting pipe. There may also be a plurality of pipes. Most figures show that a connector element, such as a connector piece 60, also belongs to the venting element 6.

FIGS. 1 to 7 show the air cooler having the mentioned inlet-side and outlet-side plate openings 1*d*, 1*e*, which are located in protrusions on a plate side and which between the protrusions provide a free space along the height of the stack.

Such a preferred design embodiment allows for the venting element 6 to be routed through the free space 7 outside the stack, such that no additional installation space is required. This is shown in FIGS. 4 to 7.

As mentioned, the first exemplary embodiment according to FIGS. 1 to 3 at present could be seen as being preferred. The venting element 6 has been disposed within the stack in a preferred liquid space 10*b*. A plate opening 1*c* for the venting element 6 is located in a base plate 9. The liquid space 10*b* is an inlet space for the liquid. Said liquid space 10*b* is formed by the plate inlet openings 1*d* which are flush in the stack. Accordingly, an outlet space 10*a* is formed by the plate outlet openings 1*e* which are flush in the stack. The inlet space 10*b* and the outlet space 10*a* are merely part of an entire liquid space 10 which is embedded in the plate pairs.

It is also highly preferable for one end of the venting element 6 to be disposed opposite the outlet 4, as is shown, for example, in FIG. 1 which illustrates a cross section through the air cooler, specifically in the region of the inlet space 10*b* and of the outlet space 10*a*.

The venting pipe as part of the venting element 6 may at least be a conjointly brazed component part of the stack.

As opposed thereto, the venting element 6 may also be manufactured from plastics or from another material. This element 6, which may be composed integrally of the pipe and the connector piece 60, is then conjointly installed in the housing 3 in the process of the assembly of the brazed stack.

The housing 3 is preferably a plastics housing. According to the images, said housing 3 is composed of a trough-like part and a planar cover part which is connected to the former. In embodiments which are not shown, these parts are two trough-like parts which are interconnected halfway up the stack. In particular, the housing 3 is an intake pipe for an internal combustion engine, which for this purpose may be designed in a different manner from the one shown. For example, said intake pipe may have a plurality of outlets 32 for the cooled charge air, which are assigned to individual cylinders of the internal combustion engine.

As is often the case, a prescribed installation position of the air cooler in an engine bay (not shown) of a motor vehicle is provided. On account thereof, the inlet 4 and the outlet 5 for the liquid have to be located on a lower side of the air cooler, or on the corresponding lower housing side, respectively. The already mentioned connector element 60 of the vent has also to be located on the lower side. In these cases which are shown, the venting element 6 extends along approximately the height of the stack. The opening 30 in the housing 3 and further openings for the inlet 4 and the outlet 5 are disposed in the lower side of the housing 3.

A connector piece 40, 50, 60 is provided in all of the openings. According to FIG. 5, a single common flange plate 33 may be provided for the three connector pieces.

Figure 4:
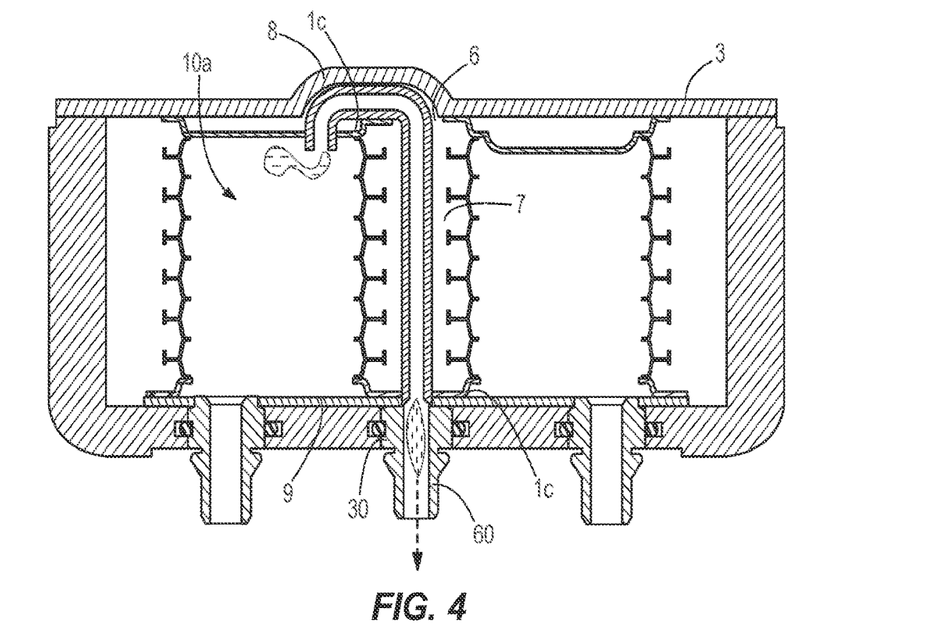
FIG. 4 is a sectional elevation view of a second embodiment of an indirect-type air cooler according to the present invention.
Figure 5:
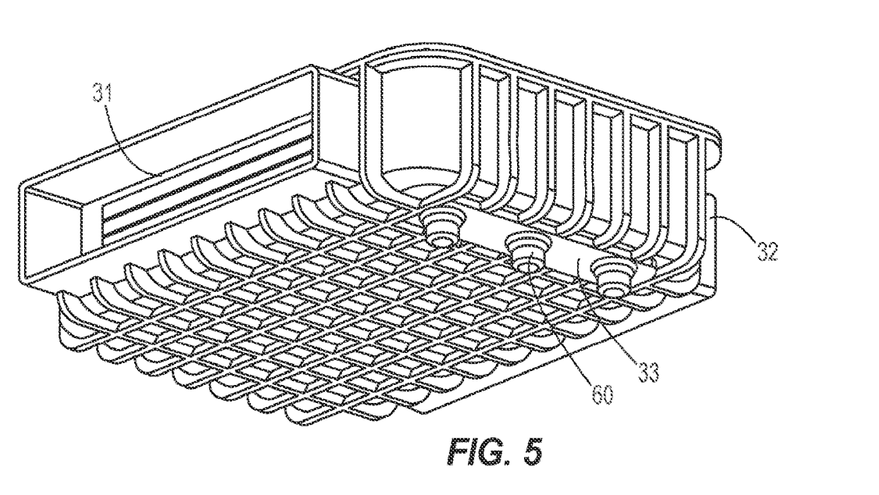
FIG. 5 is a perspective view of the air cooler of FIG. 4.
Figure 6:
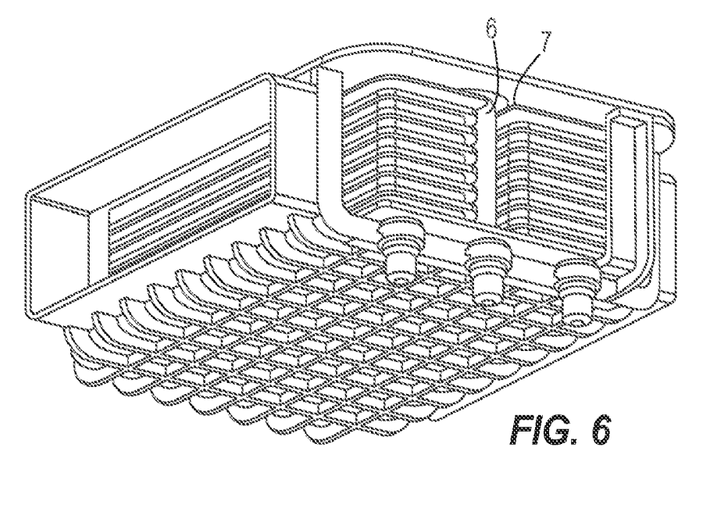
FIG. 6 is another perspective view of the air cooler of FIG. 4, with select elements removed from view.
Figure 7:
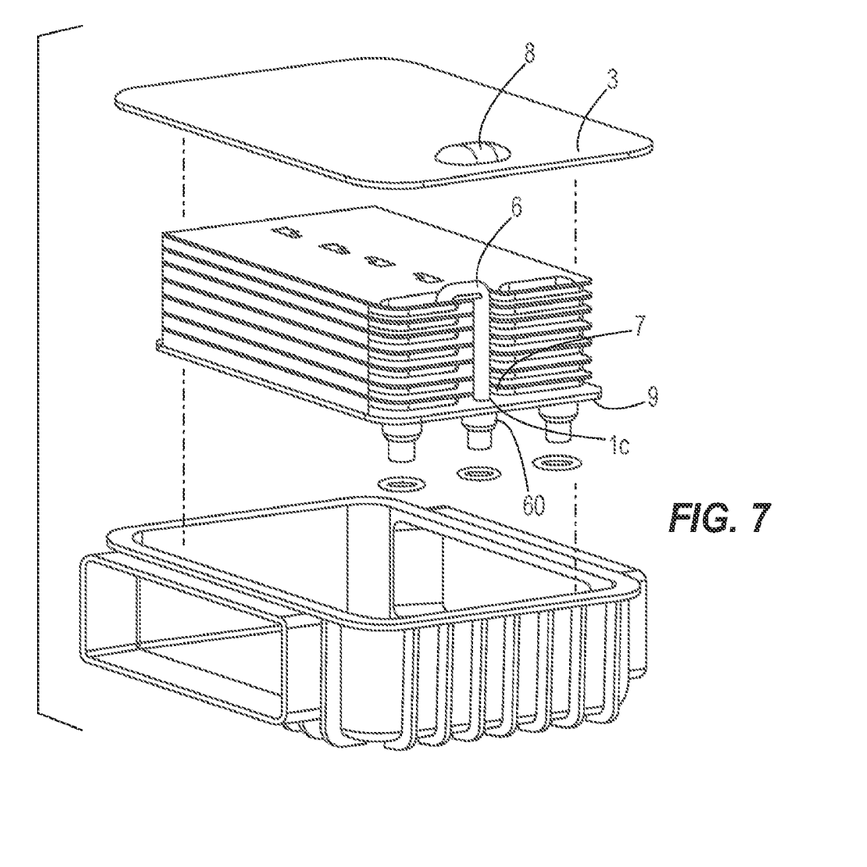
FIG. 7 is an exploded perspective view of the air cooler of FIG. 4.

The second exemplary embodiment provides a bulge 8 in the upper side of the housing 3, as is shown in FIGS. 4 and 7. The bulge 8 ensures the already mentioned compactness of the air cooler. The two mentioned plate openings 1*c* are located at the bottom in the base plate 9 and in an upper plate, as is shown by FIG. 4, for example.

FIG. 9 shows a view of the stack of a further exemplary embodiment, and FIG. 10 shows the same stack but with a section through the inlet-side plate openings 1*d*. In this exemplary embodiment the illustration of the housing 3 has been dispensed with. Therefore, the opening 30 in the housing 3, which in fact exists, is also omitted. The arrows included in the drawing for the throughflow on the liquid side clarify the mode of functioning of this embodiment. The stream which enters into the liquid space 10 is divided into two part-streams T1, T2, which is intended to be shown by the two arrows.

As is furthermore derived from the illustrations, on account of the central inlet 4 and the central outlet 5, there is presently another configuration of the plates 11. However, the stack likewise has plate pairs 1*a*, 1*b*, and also fins 2 which are disposed between the plate pairs 1*a*, 1*b*. This embodiment also has the mentioned free space 7 between the inlet-side and the outlet-side plate openings 1*d*, 1*e*. The free space 7 serves for positioning the venting element 6.

In a further embodiment (not shown) having plates, as in FIGS. 9 and 10, the venting element 6 has been disposed so as to be largely within the liquid space 10.

Figure 11:
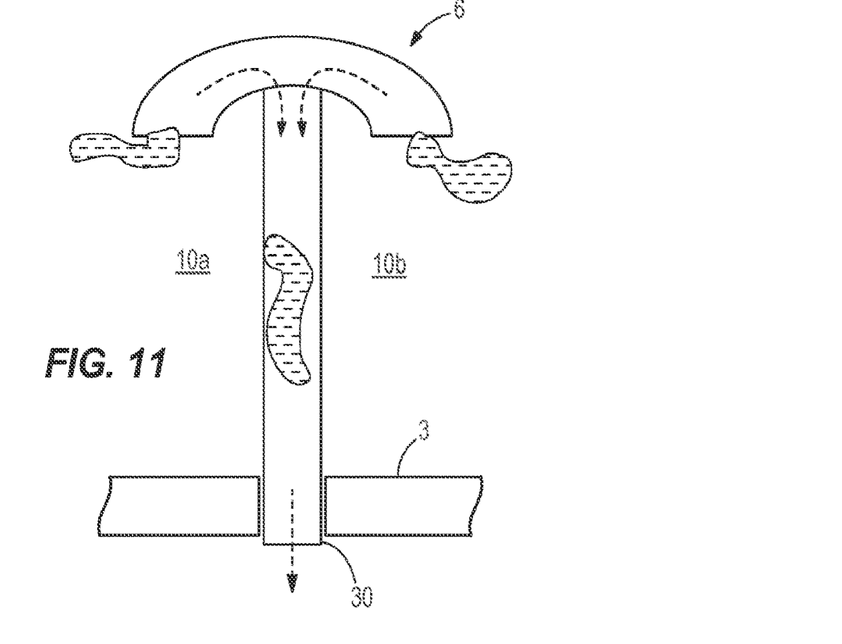
FIGS. 11 and 12 are schematic diagrams of a venting element for use in an indirect-type air cooler according to embodiments of the present invention.

FIG. 11 is a rather abstract diagram which is intended to show that the venting element 6 may be configured so as to simultaneously extract air bubbles from various points 10*a*, 10*b* of the liquid space 10.

FIG. 12 is another abstract diagram which is intended to show that the venting element 6 may be configured so as to be merely a bypass 66 between two liquid part-spaces.

FIG. 11 may clarify that the effectiveness of venting can be further improved by a corresponding design of the venting element 6. The venting element 6 may extend into a plurality of the liquid space parts and simultaneously vent all the part-spaces. Only the part-spaces 10a and 10b are shown.

FIG. 12 shows that a certain venting effect may be achieved by merely one single bypass 66 which directly, that is to say along a short path, connects a liquid entry space 10b to a liquid exit space 10a of the air cooler. The two arrows to the left and to the right of the bypass 66 are intended to indicate the same. This allows gas inclusions which enter into the entry space 10b to be directly conveyed into the exit space 10a, which means that said gas bubbles need not flow through the air cooler. Since the position of the bypass 66 should be opposite the entry 4 and the exit 5, it is sensible for a bulge 8 to also be planned in the upper housing wall 3 for this purpose.

Finally, in FIG. 12, a further pipe 67, which branches off from the bypass 66 and which can be routed through the opening 30, which is located here in the bulge 8 of the housing 3, to the exterior to the expansion tank AGB has been added by means of dashed lines. On account thereof, the venting effect is significantly improved in relation to the single bypass 66 as described in the preceding paragraph, since gas inclusions may be extracted by means of the pipe 67 both from the space 10a as well as from the space 10b. The provision of the pipe 67 has caused the bypass function to assume a background role.

Features which are not shown in the diagrams according to FIGS. 11 and 12 correspond to those features which have been shown in the other figures and have previously already been described in detail.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. An indirect-type air cooler comprising:
    a brazed stack of plates arranged in plate pairs with air fins disposed between the plate pairs, the plate pairs enclosing a liquid space for a liquid coolant;
    a housing into which the brazed stack of plates is disposed, having an air inlet and an air outlet, wherein air passing through the housing from the air inlet to the air outlet passes over the air fins to exchange heat with the liquid coolant flowing through the liquid space;
    a venting element extending through an opening of the housing such that a first end of the venting element is disposed exterior to the housing, a second end opposite the first end being fluidly connected to the liquid space;
    an inlet space portion of the liquid space, formed by a first plurality of openings in the plate pairs;
    an outlet space portion of the liquid space, formed by a second plurality of openings in the plate pairs;
    a plurality of liquid flow passages extending between and fluidly connecting the inlet space portion and the outlet space portion of the liquid space, each one of said liquid flow passages being arranged within one of the plate pairs, the plurality of liquid flow passages and the inlet and outlet space portions together defining the liquid space;
    a first connector piece extending through the housing and fluidly coupled to the inlet space portion;
    a second connector piece extending through the housing and fluidly coupled to the outlet space portion; and
    a third connector piece extending through the housing, wherein the third connector piece is part of the venting element and is arranged at the first end of the venting element.

2. The indirect-type air cooler of claim 1, wherein the first, second, and third connector pieces extend through a common side of the housing.

3. The indirect-type air cooler of claim 2, wherein said common side of the housing is a lower side of the housing when the air cooler is in operation.

4. The indirect-type air cooler of claim 1, wherein the venting element includes a venting pipe fluidly coupled to the third connector piece.

5. The indirect-type air cooler of claim 4, wherein the venting pipe is manufactured from plastic material.

6. The indirect-type air cooler of claim 4, wherein the venting pipe extends approximately the full height of the brazed stack of plates.

7. The indirect-type air cooler of claim 6, wherein a portion of the venting pipe is at a location above the brazed stack of plates when the air cooler is in operation.

8. The indirect-type air cooler of claim 7, wherein said portion of the venting pipe is between the first and second ends of the venting element.

9. The indirect-type air cooler of claim 4, wherein the venting pipe includes the second end of the venting element.

10. The indirect-type air cooler of claim 9, wherein the second end of the venting element is located within one of the inlet space portion and the outlet space portion.

11. The indirect-type air cooler of claim 10, wherein at least a portion of the venting pipe is arranged outside of the liquid space.

12. The indirect-type air cooler of claim 11, wherein at least a portion of the venting pipe is arranged in a free space between the inlet space portion and the outlet space portion.

13. The indirect-type air cooler of claim 10, wherein the entirety of the venting pipe is located within said one of the inlet space portion and the outlet space portion.

14. The indirect-type air cooler of claim 4, wherein the venting pipe is entirely located within the housing.

15. The indirect-type air cooler of claim 4, wherein the venting pipe is metallic and is joined to the stack of plates during the brazing of the stack.

16. The indirect-type air cooler of claim 1, wherein the second end of the venting element is located within one of the inlet space portion and the outlet space portion.

17. The indirect-type air cooler of claim 1, wherein the brazed stack of plates extends in a height direction and wherein the first end of the venting element is below the brazed stack of plates when the air cooler is in operation.

18. The indirect-type air cooler of claim 17, wherein at least a portion of the venting element extends above the brazed stack of plates.

19. The indirect-type air cooler of claim 17, wherein at least a portion of the venting element is arranged within the housing and extends approximately the full height of the brazed stack of plates.

20. The indirect-type air cooler of claim 19, wherein at least portion of the venting element within the housing is located external to the liquid space.

21. The indirect-type air cooler of claim 17, wherein the venting element comprises a metallic venting pipe that is joined to the stack of plates during the brazing of the stack.

22. The indirect-type air cooler of claim 21, wherein the metallic venting pipe is entirely located within the liquid space.

\* \* \* \* \*